Dec. 12, 1967   J. O. MELTON ET AL   3,357,728
BALL AND SOCKET JOINT
Filed Sept. 11, 1964

INVENTORS
JAMES O. MELTON,
THOMAS B. WILKINSON &
JAMES H. JACKSON
Dunlap & Laney
ATTORNEYS

United States Patent Office 3,357,728
Patented Dec. 12, 1967

3,357,728
BALL AND SOCKET JOINT
James O. Melton, 1208 Cruce St., Norman, Okla. 73069; and Thomas B. Wilkinson, 5924 S. Eggleston 74734, and James H. Jackson, 1730 N. Shawnee 73107, both of Oklahoma City, Okla.
Filed Sept. 11, 1964, Ser. No. 395,692
9 Claims. (Cl. 287—90)

This invention relates generally to improvements in the construction of ball joints. More particularly, but not by way of limitation, the invention relates to an improved seal construction that permits the full and unrestricted motion of the ball joint while providing an effective dirt and water seal therefor.

Ball and socket joints are used to interconnect certain relatively moving members in an automobile suspension. The relatively moving members are generally associated with the steering linkage and/or the suspension of the front wheels of automobiles, consequently, the ball and socket joints are exposed to environmental conditions which may include exposure to dust or dirt or large quantities of water, ice or mud. When the operating environment of ball and socket joints used on automobiles is considered, it can be readily realized that even with a regular lubricating program to protect the ball joints, and with the use of new synthetic materials to form the bearing surfaces, the ball joints are still subjected to conditions conducive to the disposition of foreign matter in the joint. The natural result of the presence of such deleterious matter is a high degree of wear and short bearing life for the ball and socket joints.

Due to the adverse operating conditions, it has been found highly desirable, if not necessary, to provide some means of preventing or reducing the entrance of dirt or other foreign matter into the bearing portions of the ball and socket joints. United States Patent No. 2,957,713 issued to E. J. Herbenar, on Oct. 25, 1960, illustrates one form of seal which has been utilized when the exterior portion of the socket housing is of spherical or frusto-spherical configuration. The construction disclosed by Herbenar involves the use of one or more seal members disposed in sealing engagement with the stud of a ball and stud member and having an inner spherical surface arranged to engage the exterior spherical surface of the housing. The seal member is of sufficient size to move with the stud and yet maintain a stud opening in the housing closed, thereby preventing the entrance of dirt through the opening into the bearing portion of the ball and socket joint. While the seal disclosed by Herbenar functions very well, it does require an exterior spherical surface on the housing and a mating spherical seal surface.

To avoid the requirement of forming a spherical exterior on the housing, a number of seals have been proposed which generally follow the disclosure of United States Patent No. 2,921,809 issued Jan. 19, 1960, to A. W. Kogstrom. Seals of the type disclosed therein generally include a rubber boot or skirt member having one end fixed to the ball joint housing and having the other end of the boot arranged so that it can rotate relative to the ball and stud member. With such an arrangement, adequate rubber material forming the boot is provided to accommodate relative angular movement between the two members connected by the ball and socket joint. As used hereinafter, "angular movement" refers to any movement of the ball and stud member relative to the ball joint housing except movement about the axis of the ball and stud member. Movement about the axis is referred to hereinafter as "rotational movement."

A large amount of difficulty has been encountered in attempting to utilize seals of the last mentioned type because of the tendency of the seal to fail due to the twisting of the skirt or boot during relative rotational movement of the two members. Kogstrom has attempted to solve this problem by providing a relatively rigid member that encircles the stud and is connected with the soft rubber boot to permit relative rotation between the stud and boot while maintaining a seal and without distorting or twisting the boot.

This invention contemplates a seal for use in connection with ball joints which are interposed between two relatively moving members. The seal includes a disc-like member which encircles the stud portion of the ball and stud member and is disposed adjacent one of the two relatively moving members, a ring-like member which encircles the housing of the ball joint and is disposed adjacent the other relatively moving member, and a hollow skirt member which is sealingly and slidingly engaged with the disc-like member at one end and at its other end is sealingly engaged with the ring-like member. The arrangement is such that the hollow skirt member can be constructed from a material that is sufficiently flexible to permit relative angular movement between the two moving members and at the same time is sufficiently rigid to prevent distortion of the skirt member during relative rotational movement between the two moving members.

One object of the invention is to provide an improved seal for use with ball joints which effectively prevents the entrance of dirt or other foreign matter into the moving parts of the ball joint.

Another object of the invention is to provide an improved seal for use with ball joints that utilizes relatively moving parts to prevent twisting of the seal during relative rotational movement between the members connected by the ball joint.

Still another object of the invention is to provide an improved seal that is not subject to being easily torn.

A still further object of the invention is to provide an improved seal for use with ball joints that is positively restrained in place on the ball joint.

One other object of the invention is to provide an improved seal for ball joints that can be quickly and easily assembled.

A still further object of the invention is to provide an improved seal for ball joints that can be economically and easily manufactured.

The foregoing and additional objects and advantages of the invention will become more apparent as the following description is read in conjunction with the accompanying drawing wherein like reference characters denote like parts in all views and wherein.

Figure 2:
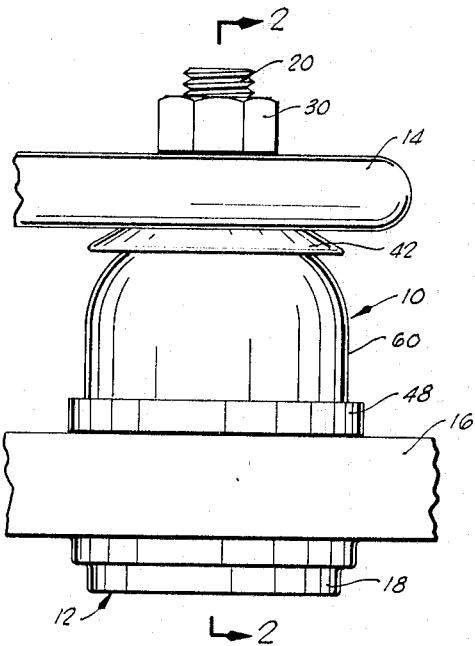
FIG. 2 is a cross sectional view of FIG. 1 as taken along the line 2—2 of FIG. 1.
Figure 1:
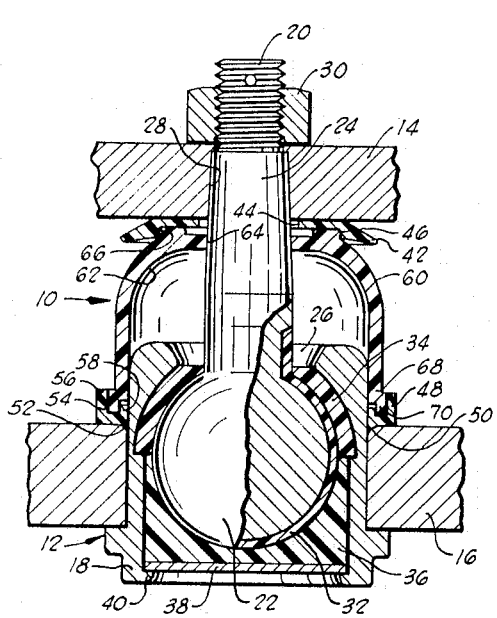
FIG. 1 is an elevation view illustrating a ball joint interposed between two relatively movable members and showing a seal, constructed in accordance with the invention, mounted thereon.

Referring now to the drawing and to FIGS. 1 and 2 in particular, shown therein and generally designated by the reference character 10, is a seal constructed in accordance with the invention. As illustrated, the seal 10 encircles a ball and socket joint 12 which is installed between an upper member 14 and a lower member 16. The members 14 and 16 may be components of a vehicle suspension system.

As shown more clearly in FIG. 2, the ball joint 12 includes a generally cylindrical housing member 18 which is mounted in the lower member 16 and a ball and stud member 20 which has a ball portion 22 thereof movably positioned in the housing 18. A stud portion 24 of the ball and stud member 20 extends through an enlarged aperture 26 in the upper end of the housing 18. The stud portion 24 is tapered and extends through a mating tapered opening 28 in the upper member 14. A nut 30 is threadedly attached to the stud portion 24 to retain the upper member 14 on the ball and stud member 20.

The ball portion 22 of the ball and stud member 20 preferably has its outer surface coated with a high density plastic such as nylon, Teflon, Delrin, etc. To eliminate the need for lubricating the ball and socket joint 12, the interior of the housing 18 is fitted with a pair of inserts 34 and 36 which are preferably formed from a high density plastic material which has natural lubricating characteristics and which is constructed of a dissimilar material to that used for the coating 32 on the ball and stud member 20. The ball and stud member 20 and the inserts 34 and 36 are retained in the housing 18 by a circular plate 38 which has been inserted in the open end of the housing 18 and fixed therein by deforming the housing surrounding the opening as shown at 40.

A seal assembly 10 includes an upper disc-like member 42 which is provided with a central bore 44 sized to loosely encircle the stud portion 24 of the ball and stud member 20. The lower surface of the disc-like member 42 is counterbored to provide a groove 46 extending around the periphery of the counterbore. A lower or ring-like member 48 encircles the housing 18 and is disposed adjacent the lower member 16. As illustrated, the lower surface of the ring-like member 48 is provided with an annular protuberance 50 which is substantially triangular in cross section and projects downwardly into a recess 52 formed by a countersink in the member 16 surrounding the housing 18. The upper surface of the ring-like member 48 has an annular recess 54 formed therein providing an exterior rim 56 and a shortened interior rim 58.

A hollow skirt member 60 extends between the disc-like member 42 and the ring-like member 48. An upper end 62 of the skirt member 60 is provided with an axial bore 64. The stud portion 24 of the ball and stud member 20 extends through the bore 64 and is in sealing engagement with the skirt member 60. The upper end 62 is also provided with a flange portion 66 which extends peripherally about the upper end 62 and is sized to slidingly engage the groove 46 in the disc-like member 42. It should be noted that the disc-like member 42 has an outside diameter sufficiently large to project over the upper end 62 of the hollow skirt member 60 to aid in preventing the entrance of dirt or other deleterious materials into the area surrounding the point of engagement between the skirt member 60 and the stud portion 24.

As clearly shown in FIG. 2, the hollow skirt member 60 has a lower end 68 which is relatively larger than the upper end 62. The lower end 68 closely encircles the exterior of the housing 18 and has a peripheral flange 70 formed thereon. The flange 70 is suitably arranged to enter the recess 54 in the ring-like member 48 and to form a fluid tight seal therewith.

In the preferred embodiment of the seal 10, the disc-like member 42 and the ring-like member 48 are constructed from a relatively rigid material, such as nylon or Teflon, which preferably has natural lubricating characteristics. The hollow skirt member 60 is preferably formed from resilient material which will yield during angular movement between the members 14 and 16 and will return to its original configuration after the members 14 and 16 have returned to the positions shown in FIGS. 1 and 2. Furthermore, the material forming the hollow skirt 60 is preferably a relatively stiff material so that it will resist any tendency to twist during relative rotational movement between the members 14 and 16. For example, two materials, which have been found satisfactory for forming the skirt member 60, are polyethylene and ethylene vinyl acetate. The preferred material of construction is ethylene vinyl acetate copolymer. The use of a dissimilar material for the skirt member 60 and the disc-like member 42 further reduces the resistance to sliding when rotational movement occurs.

Figure 3:
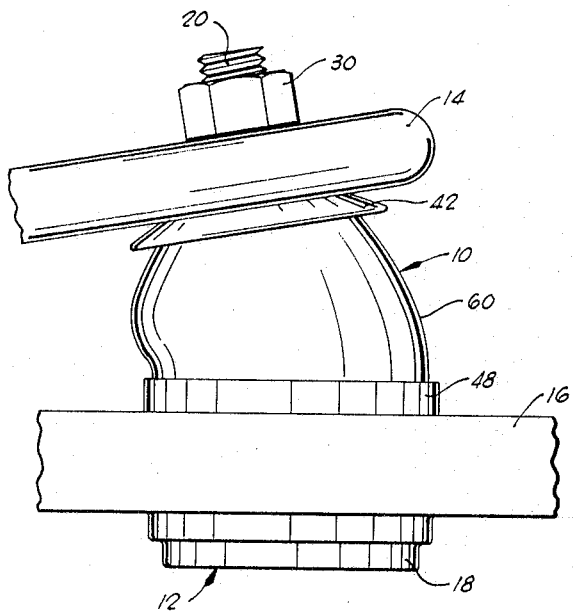
FIG. 3 is a view similar to FIG. 1, but showing the configuration of the seal during relative angular movement between the relatively movable members.

FIG. 3 illustrates the deformation of the hollow skirt member 60 during relative angular movement between the members 14 and 16. During such angular movement, the various parts of the seal 10 remain interconnected as previously described, and, therefore, no portion of the ball joint 12 is uncovered, thereby preventing the entrance of deleterious materials into the ball joint. As previously mentioned, the hollow skirt member 60 is constructed from material which has sufficient flexibility to permit the deformation as shown in FIG. 3, but is sufficiently rigid to permit sliding movement of the peripheral flange 66 on the upper end 62 of the hollow skirt 60 in the groove 46 of the disc-like member 42 during rotational movement of the ball joint 12. Due to the permissive movement between the hollow skirt member 60 and the disc-like member 42 and due to the stiffness of the hollow member 60, there is no tendency for the skirt 60 to be twisted during relative rotational movement between the members 14 and 16. As previously mentioned, repeated twisting of the skirt member 60 could otherwise result in the destruction of the seal. If desired, relative rotational movement can also occur between the flange 70 on the lower end 68 of the skirt member 60 and the recess 54 in the ring-like member 48. However, it is preferred that the flange 70 fit tightly into the recess 54 so that there is no tendency for the lower end 68 of the skirt member 60 to be withdrawn from the recess 54 during relative angular movement between the members 14 and 16. Stated in another way, it is preferred that the ring-like member 48 and the skirt member 60 rotate as a unit with the member 16 and the housing 18 while disc-like member 42 rotates as a unit with the upper member 14 and the ball and stud member 20.

From the foregoing description, it can be seen that the hollow skirt 60 may be advantageously constructed from a relatively stiff material which is sufficiently flexible to accommodate the relative angular movement between the members 14 and 16. The hollow skirt member 60 may therefore be constructed from material which is also sufficiently tough to alleviate the problems that have occurred in the past as a result of using skirts or boots that were constructed from relatively fragile materials. Such fragile materials were, as previously mentioned, subject to being easily torn by brush, weeds or other materials over which the vehicle is driven as well as being moved out of sealing position by accumulations of mud or ice on or around the ball joints. It can be appreciated that even though the seal 10 is constructed from relatively stiff and strong materials, it will maintain an efficient seal thereby preventing the entrance of dirt or other deleterious materials into the joint while at the same time permitting freedom of movement of the members 14 and 16 which are connected by the ball joint 12.

It should also be apparent from the foregoing that the seal 10 can be easily and inexpensively manufactured by well known molding procedures and that the seal 10 can be quickly and easily assembled with the ball joint 12.

Although a typical and exemplary embodiment of the invention has been disclosed from the foregoing description and the accompanying drawings, it will be readily perceived that certain modifications and changes may be made in the specific structure described without a significant departure from the basic principles which underline the invention. Insofar, therefore, as such changes and innovations continue to rely upon these basic principles, all modified versions of the specific structure herein described by way of example are deemed to be circumscribed by, and to fall within, the spirit and scope of the present invention except as the same may be necessarily limited by the appended claims or reasonable equivalents thereof.

We claim:
1. A seal for a ball joint comprising:
a disc-like member having an axial bore therethrough, an axial counterbore extending partially therethrough, and a groove in said disc-like member adjacent the periphery of said counterbore;
a ring-like member having upper and lower surfaces, said upper surface having an annular recess therein; and,
a hollow skirt member having a lower end and an upper end, said upper end having a peripheral flange thereon disposed in the groove in said disc-like member, said lower end having a peripheral flange thereon disposed in the annular recess in said ring-like member.

2. The seal of claim 1 wherein said hollow skirt member is formed from a relatively stiff, resilient material and has the peripheral flange on the upper end thereof sized to slidingly fit with the groove in said disc-like member, whereby said skirt member can rotate relative to said disc-like member.

3. The seal of claim 2 wherein the lower surface of said ring-like member has an annular protuberance of substantially triangular cross-section adjacent the inner periphery thereof.

4. A seal for a ball joint including a ball and stud member and a housing member for receiving the ball and stud member, said seal comprising:
a disc-like member having an axial bore therethrough sized to encircle the stud portion of the ball and stud member, an axial counterbore extending partially therethrough, and a groove therein adjacent the periphery of said counterbore;
a ring-like member encircling the housing member and having upper and lower surfaces, said upper surface having an annular recess therein; and,
a hollow skirt member encircling the ball-joint and having a lower end and an upper end, said upper end having a peripheral flange thereon disposed in the groove in said disc-like member, said lower end having a peripheral flange thereon disposed in the annular recess in said ring-like member.

5. The seal of claim 4 wherein
said hollow skirt member is constructed from a flexible material; and,
the uppper end of said skirt member is provided with a bore sized to sealingly encircle the stud portion of the ball and stud member and said peripheral flange is sized to permit relative rotation between said skirt member and disc-like member.

6. The seal of claim 4 wherein the lower surface of said ring-like member is provided with an annular protuberance having a generally triangular cross-section; said protuberance being disposed adjacent the housing member when said seal is assembled with said ball joint.

7. A ball joint for connecting first and second relatively moving members, the ball joint comprising:
a cylindrical housing member mounted in the first relatively moving member and having an open end and an aperture extending through the other end;
a ball and stud member having a ball portion and a stud portion, said ball portion being movably positioned in said housing and said stud portion extending through said aperture and connected with the second relatively moving member;
said ball portion having a relatively thin coating of high density plastic;
a pair of insert members having frusto-spherical interior surfaces disposed within said housing adjacent said ball portion, said insert members being constructed from a different high density plastic of dissimilar molecular structure to the plastic forming the coating on said ball portion;
a plate member closing the open end of said housing to retain said ball and stud member and insert members within said housing; and,
seal means encircling said ball joint disposed between said relatively moving members to prevent the entrance of dirt and other foreign matter into said ball joint, said seal means including
a disc-like member encircling said stud portion and disposed adjacent the second moving member,
a ring-like member encircling said housing and disposed adjacent the first moving member, and
a hollow skirt member encircling said ball joint and having one end slidingly connected with said disc-like member and having the other end connected with said ring-like member, said skirt member being constructed from a different plastic of dissimilar molecular structure than said disc-like and ring-like members.

8. A ball joint for connecting two relatively moving members, the ball joint comprising:
a housing mounted in one of said relatively moving members;
a ball and stud member having a ball portion and a stud portion, said ball portion being movably positioned in said housing and said stud portion being connected with the other relatively moving member;
seal means encircling a portion of said ball joint disposed between said relatively moving members to prevent the entrance of dirt and other foreign matter into said ball joint, said seal means including
a disc-like member encircling said stud portion and disposed adjacent one of said relatively moving members, said disc-like member having a circular groove therein formed axially with respect to said stud portion,
a ring-like member encircling said housing member and having an upper surface and a lower surface, said ring-like member being disposed adjacent the other said relatively moving members, and said upper surface of the ring-like member having an annular recess therein, said ring-like member being provided with an annular protuberance of substantially triangular cross-section disposed adjacent the housing member and projecting into a counter sunk portion of said relatively moving member and forming a seal therewith, and
a hollow skirt member encircling said ball joint and having an upper end and a lower end, said upper end having a peripheral flange thereon disposed in the groove in said disc-like member, said lower end having a peripheral flange thereon disposed in the annular recess in said ring-like member.

9. The ball joint of claim 8 wherein the upper end of said skirt member has a bore sized to sealingly engage the stud portion of said ball and stud member and wherein the peripheral flange thereon is sized to permit relative rotation between said skirt member and disc-like member.

References Cited
UNITED STATES PATENTS
| | | | |
|---|---|---|---|
| 2,197,037 | 4/1940 | Gardner | 287—90 |
| 3,175,384 | 3/1965 | Wallace et al. | 287—87 |
| 3,227,478 | 1/1966 | Gottschald | 287—87 |

FOREIGN PATENTS
| | | |
|---|---|---|
| 949,966 | 2/1964 | Great Britain. |

CARL W. TOMLIN, *Primary Examiner.*
A. V. KUNDRAT, *Assistant Examiner.*